United States Patent
Bear et al.

(10) Patent No.: US 7,216,221 B2
(45) Date of Patent: May 8, 2007

(54) METHOD AND SYSTEM FOR UNIFIED AUDIO CONTROL ON A PERSONAL COMPUTER

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale C. Crosier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 10/677,101

(22) Filed: Sep. 30, 2003

(65) Prior Publication Data

US 2005/0071626 A1    Mar. 31, 2005

(51) Int. Cl.
*G06F 17/00* (2006.01)
(52) U.S. Cl. ............................ 713/1; 700/94; 381/101; 381/104; 381/105; 381/106; 381/107
(58) Field of Classification Search .................. None
See application file for complete search history.

(56) References Cited

U.S. PATENT DOCUMENTS

| | | | |
|---|---|---|---|
| 4,860,342 A | | 8/1989 | Danner |
| 6,240,168 B1 | | 5/2001 | Stanford et al. |
| 6,346,934 B1 | * | 2/2002 | Wugofski ................... 345/158 |
| 6,518,957 B1 | | 2/2003 | Lehtinen et al. |
| 6,603,855 B1 | | 8/2003 | Cannon et al. |
| 6,671,356 B2 | * | 12/2003 | Lewis ...................... 379/88.13 |
| 6,757,372 B1 | * | 6/2004 | Dunlap et al. .......... 379/142.17 |
| 6,831,657 B2 | * | 12/2004 | Tsutsumi et al. ........... 345/589 |
| 6,912,283 B2 | * | 6/2005 | Meyerson et al. ...... 379/428.04 |
| 6,970,556 B2 | * | 11/2005 | Wall et al. ............. 379/355.09 |
| 6,976,216 B1 | * | 12/2005 | Peskin et al. ................ 715/716 |
| 6,980,641 B1 | * | 12/2005 | Stanford et al. ............ 379/354 |
| 6,996,445 B1 | * | 2/2006 | Kamijo ....................... 700/94 |

FOREIGN PATENT DOCUMENTS

| | | |
|---|---|---|
| EP | 0772327 A2 | 5/1997 |
| EP | 0777394 A1 | 6/1997 |
| EP | 0838934 A1 | 4/1998 |
| EP | 0772327 A3 | 2/1999 |
| WO | WO9602049 A1 | 1/1996 |

* cited by examiner

*Primary Examiner*—A. Elamin
(74) *Attorney, Agent, or Firm*—Workman Nydegger

(57) ABSTRACT

A system and method for improved audio controls on a personal computer is provided. The system and method provide a unified architecture for audio controls across hardware and software interfaces of the personal computer. An intelligent facility may automatically change audio controls for users to simply interact with various communications and media applications. To this end, a configurable audio controller intelligently handles various aspects of the system's audio devices by following various rules that may be based at least in part on user-configurable settings and a current operating state. The present invention also provides audio controls so that a user may easily change audio settings such as the volume of an audio output device. There are many applications that may use the present invention for automatic control of audio devices based upon the user's context.

56 Claims, 8 Drawing Sheets

METHOD AND SYSTEM FOR UNIFIED AUDIO CONTROL ON A PERSONAL COMPUTER

CROSS-REFERENCE TO RELATED APPLICATIONS

The present invention is related to the following copending U.S. patent applications filed concurrently herewith, assigned to the assignee of the present invention, and hereby incorporated by reference in their entireties:

"Method and System for Auxiliary Display of Information for a Computing Device," U.S. patent application Ser. No. 10/429,932;

"Real-Time Communications Architecture and Methods for use with a Personal Computer System," U.S. patent application Ser. No. 10/429,905;

"Record Button on a Computer System," U.S. patent application Ser. No. 10/429,904;

"Method and System for Auxiliary Processing Of Information for a Computing Device," U.S. patent application Ser. No. 10/429,930;

"System and Method for Activating a Computer System," U.S. patent application Ser. No. 10/430,369;

"Computer System with Do Not Disturb System and Method," U.S. patent application Ser. No. 10/429,903;

"Computer Camera System and Method for Reducing Parallax," U.S. patent application Ser. No. 10/429,943;

"Control and Communications Panel for a Computer System," U.S. patent application Ser. No. 10/429,933; and "Notification Lights, Locations and Rules for a Computer System," U.S. patent application Ser. No. 10/429,931.

FIELD OF THE INVENTION

The invention relates generally to computer systems, and more particularly to an improved method and system for unifying audio control on a personal computer.

BACKGROUND OF THE INVENTION

The role of contemporary computers continues to evolve as a tool used for communications and media applications. Personal computers offer many new and exciting media applications for personal entertainment such as live television, personal video recording, playing or recording digital music, displaying or creating digital photographs, playing movies recorded on a DVD, and so forth. Traditionally, sound for these media applications has been controllable by several audio controls made available on a personal computer. For example, sound may be controlled by software for soundcards that allow tuning for volume, treble, bass, and wave balance. Sound may also be controlled on a personal computer by sound synthesis software, by a media player, or by hardware controls such as a volume control on the speakers.

With the introduction of Voice-over-IP (VoIP) and other IP telephony applications, computers may also be used for handling phone calls and voice mail in addition to handling media applications and customary communication applications such as email, instant messaging, fax communications, and so forth. A personal computer with integrated telephony can enhance voice and video communication in ways that empower the user while increasing user productivity and enjoyment. For example, a personal computer may be designed that is capable of accepting incoming calls of various kinds such as analog Public Switched Telephone Network (PSTN), private branch exchange (PBX), cellular telephony or VoIP. There is the potential for such a personal computer to be connected to telephone equipment for PSTN, cellular telephony or PBX, and provide an enhanced user interface such as for handling voice mail.

What is needed is a unified architecture for audio controls across hardware and software interfaces of the personal computer. Such a system and method should operate in what is perceived to be a consistent, flexible and extensible manner. Additionally, this unified architecture should be capable of handling telephony applications, media applications, and switching between communications modalities.

SUMMARY OF THE INVENTION

Briefly, the present invention provides an improved system and method for unifying audio controls on a personal computer. To this end, a master controller is provided that may control attributes of the audio stream, such as the volume, by communicating with the input and output drivers of the audio stream. This unified architecture also supports intelligent features for automatically changing audio controls for users to easily interact with various communications and media applications. A configurable master audio controller intelligently handles various aspects of the system's audio devices by following various rules that may be based (at least in part) on user-configurable settings and a current operating state. The master audio controller may respond to externally received events, such as incoming calls, forwarded voicemail messages, and so forth. For example, when a there is an incoming call, the master audio controller may turn down the volume on the system speakers. The master audio controller likewise responds to user actions such as plugging in headphones, playing voicemail, and so forth. In general, the system and method of the present invention supports intelligent features for automatically changing audio controls for users to simply interact with various communications and media applications.

The present invention also provides audio controls which may be placed in various locations such as on the computer housing, on a keyboard, on a monitor or a remote control. With these controls, a user may easily change audio settings such as the volume of an audio output device. In addition to the audio volume control and a speaker mute button, other audio controls may be easily added, such as a wave balance control knob, a treble control knob, a bass control knob, and so forth. Pressing the speaker mute button allows the user to quickly mute the default system audio output device such as the system speakers. A speaker system volume knob also allows the user to adjust the volume of the default system audio output device. Because the state of an individual audio control button may not be readily apparent to a user, an indicator light such as an LED may be located adjacent to or integrated into each audio control button.

There are many applications that may use the present invention for automatic control of audio devices based upon the user's context. For instance, when notified of an incoming call, a user may press a telephony control button such as a speakerphone button to answer the call. Before the call is connected to the speaker and microphone, the master audio controller may automatically mute (or pause if appropriate) any other audio, such as music that the user was listening to prior to the call. At the end of the call, the user may again press the speakerphone button to disconnect the call, and the master audio controller may restore the audio state as it was prior to the call. As another example, if the user plugs in headphones, the master audio controller may switch the default system audio output device from the PC system speakers to the headphones and mute the system speakers so that they do not disturb others. When the user unplugs the headphones, the master audio controller switches the default system audio output device from the headphones back to PC system speakers and restores their audio volume.

In general, the system and method is fairly comprehensive as well as flexible and extensible to handle any audio devices, and additional audio controls may be easily added as needed. Other advantages will become apparent from the following detailed description when taken in conjunction with the drawings, in which:

DETAILED DESCRIPTION

Exemplary Operating Environment

Figure 1:
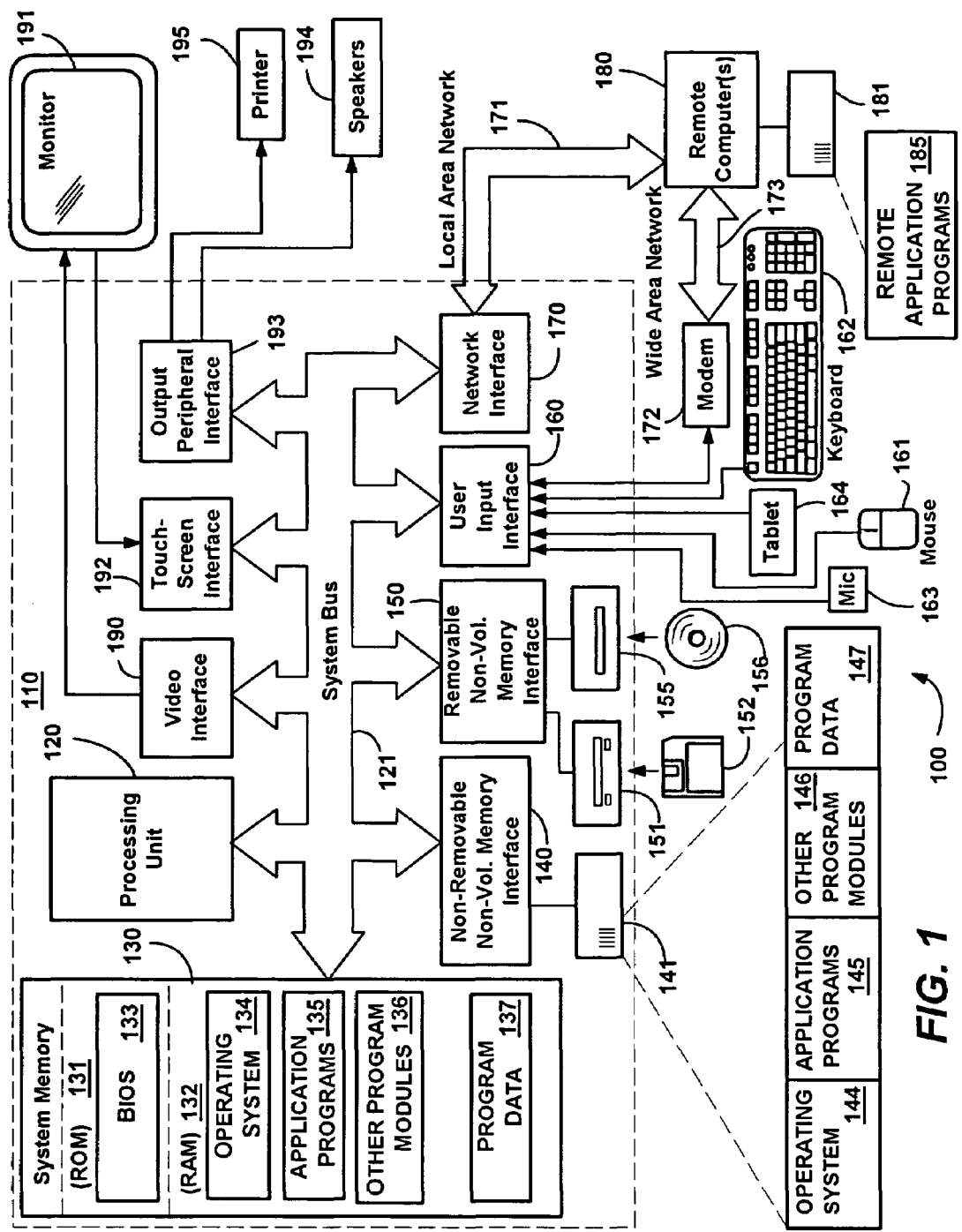
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with-the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Unified Audio Controls

The present invention is generally directed towards an improved method and system for unifying audio controls on a personal computer. The system and method provide a unified architecture for controlling audio across hardware and software interfaces of the personal computer. To this end, a master audio controller, also referred herein as an audio controller, is provided that may control attributes of the audio stream, such as the volume, by communicating with the input and output drivers of the audio stream. This unified architecture also supports intelligent features for automatically changing audio controls for users to easily interact with various communications and media applications. A configurable master audio controller intelligently handles various aspects of the system's audio devices by following various rules that may be based at least in part on user-configurable settings and a current operating state. The master audio controller may respond to external events received such as incoming calls, forwarded voicemail messages, and so forth. For example, when a there is an incoming call, the master audio controller may turn down the volume on the system speakers. The master audio controller likewise responds to user actions such as plugging in headphones, playing voicemail, and so forth. The present invention also provides audio controls so that a user may easily-change audio settings such as the volume of an audio output device.

There are many applications that may use the present invention for automatic control of audio devices based upon the user's context. For example, if a user plugs in headphones, the master audio controller may switch the default system audio output device from the PC system speakers to the headphones and mute the system speakers so that they do not disturb others. When the user unplugs the headphones, the master audio controller switches the default system audio output device from the headphones back to PC system speakers and restores their audio volume. As will be understood, the various architecture diagrams, devices and scenarios described herein are only examples, and there are many other scenarios to which the present invention will apply.

Figure 2:
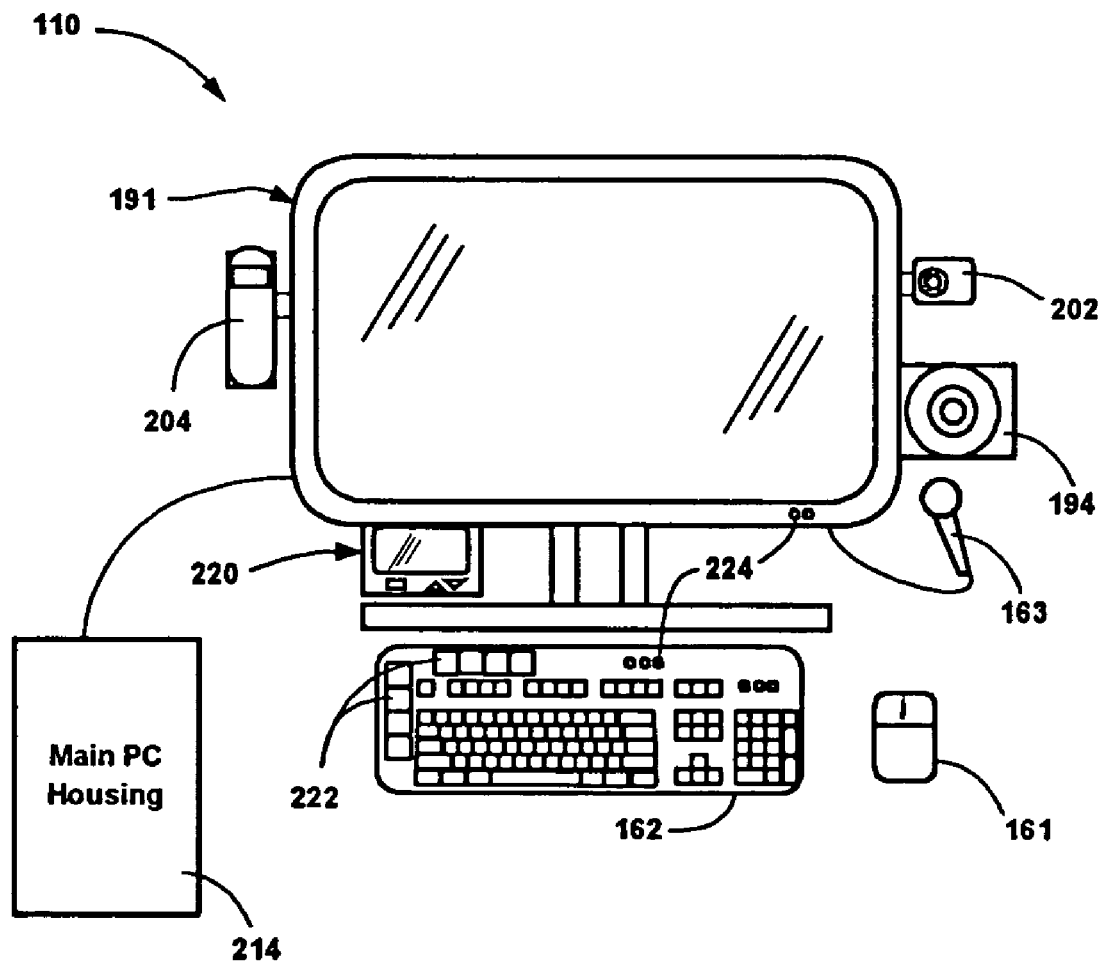
FIG. 2 is a general representation of a computer system arranged with integrated communications-related devices including audio controls, in accordance with an aspect of the present invention.

Turning to FIG. 2 of the drawings, there is shown a computer system, such as the computer system 110 of FIG. 1, in which various communications-related devices are integrated, including audio controls. For example, the computer system 110 includes a monitor 191 having an attached camera 202, an attached telephone (e.g., handset) 204, and an attached speaker 194, which along with a microphone 163, may function as a speakerphone. Other devices not separately represented in FIG. 2 include mobile communications devices such as a cellular telephone or other mobile computing device capable of connecting in some way (e.g., by wired cradle or Bluetooth™ technology) with the computer system. Although shown as individual devices in FIG. 2, it is understood that any or all of these devices, such as the speaker 194 and microphone 163, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage). As used herein, the term "connect" and "couple" and their variants are equivalent and generally mean that there is some type of information capable of being transferred between one entity and another, regardless of whether directly or indirectly via any intermediaries and/or any transformation of the information.

Also represented in FIG. 2 is an auxiliary display device 220, such as for displaying caller ID data or like information. The auxiliary display 220 is typically small (relative to the main display screen 191), and may be the display of another device, such as the screen of a mobile computing device, but may also be a dedicated display, such as one that is operably coupled to the computer operating system when the computer system 110 is in a powered-up state. Further, note that the auxiliary display need not be an actual display, but can be a projection (e.g., onto a wall) of the information. The auxiliary display device 220 may provide some of its own processing and storage resources, so as to remain functional to some extent when the computer operating system is not running. The keyboard 162 and/or monitor 191 (and/or possibly the pointing device 161) may also include non-conventional buttons 222, such as buttons related to audio controls, and non-conventional LED indicators 224, such as indicators related to audio controls.

Figure 3:
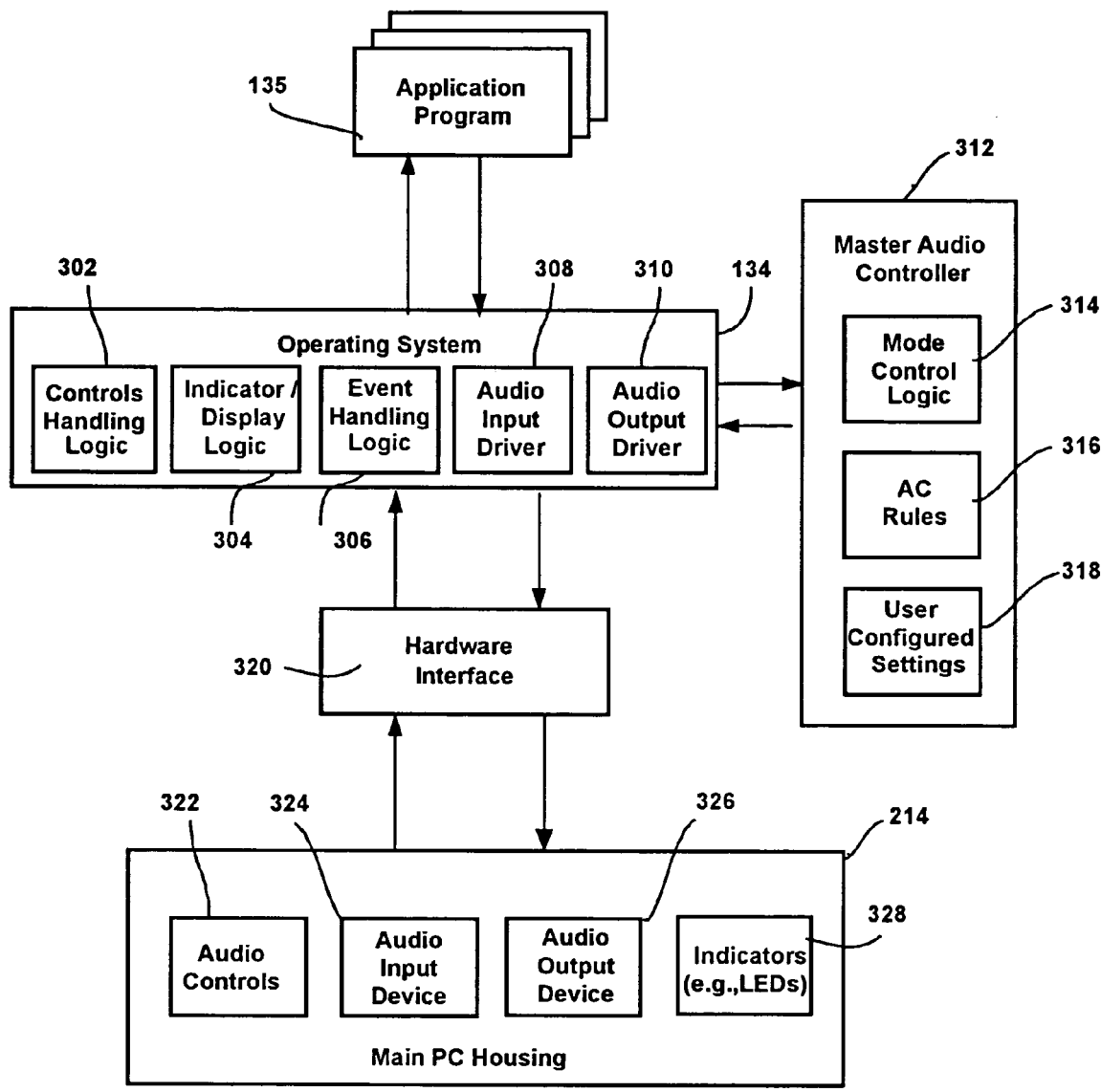
FIG. 3 is a block diagram generally representing the components in an exemplary embodiment of the audio architecture, in accordance with an aspect of the present invention.

As generally represented in FIG. 3, the computer system 110 may include a master audio controller 312, primarily implemented in a software component or set of software components, that may control attributes of an audio stream, such as the volume, by communicating with an audio input driver 308 and an audio output driver 310 of the audio stream. As used herein, an audio stream means any representation or encoding of sound including a digital representation or an analog signal. The audio input driver 308 communicates with the hardware interface 320 to receive input from an audio input device 324 such as microphone 163. The audio output driver 310 likewise communicates with the hardware interface 320 to send output to an audio output device 326 such as speakers 194. For example, the master audio controller 312 may send control data to a sound card controller, or to the audio controller for the chipset incorporated on the motherboard in place of a sound card, to adjust an attribute of the audio stream such as the volume. Where there is a direct input available for a hardware volume control, any adjustment of the hardware volume control received by the sound card or audio processing chip may be forwarded to the master audio controller for setting the volume of all audio streams as appropriate on the system. In an alternative embodiment, the master audio controller may provide system-wide control of the attributes of any audio streams by having each logical audio driver redirect its audio stream to the master audio controller instead of directly sending the audio stream to its respective audio output driver. The master audio controller may then adjust any attributes of any audio stream before forwarding the audio stream to the audio output driver. Yet again, in a third embodiment, each audio input device may directly send its audio stream to the master audio controller. The master audio controller may then modify each audio stream as appropriate and directly send the audio stream to the audio output driver for the audio output device. Moreover, the master audio controller may control two or more channels or audio streams as a group in any of these embodiments, including mixing of channels.

The master audio controller also intelligently handles various aspects of the system's audio input and output devices when events are received. For example, when a there is an incoming call, the master audio controller may turn down the volume on the system speakers. Note that the master audio controller 312 need not be built into the computer system 110, but can connect thereto as an add-on device or part of an add-on device such as a communications panel, via a USB connection or other connection.

To handle the system's various audio input and output devices, the master audio controller 312 includes mode control logic 314 that follows various rules 316 and/or is based at least in part on other user-configurable settings and a current operating state 318. The mode control logic 314 responds to external events received such as incoming calls, forwarded voicemail messages, and so forth. In general, any event generated by the system software and hardware may be received by the event handling logic 306. The mode control logic 314 likewise responds to user actions such as plugging in headphones, playing voicemail, and so forth. User actions can occur and be detected in any number of ways, including essentially any way of providing user action data or intended action data to a computer system. For example, such actions can include lifting or replacing the attached handset 204, which correspondingly actuates a hook switch generating an event received by the event handling logic 306. Similarly, buttons on a device such as a talk button on the handset or buttons on the keyboard 162, (e.g., a speakerphone button, a flash button, and so on) generate events received by the event handling logic 306. Controls 420 accompanying the auxiliary display 220, such as in the form of scroll buttons and possibly an enter or select button (or equivalent button elsewhere on the system such as the flash button), can also provide user action data, as can the computer data entry mechanisms such as a keyboard 162 and mouse 161. Any microphone, such as the microphone 163, can also provide user action data, e.g., via speech recognition (command and control) performed with a speech to text recognizer. User action information may also be communicated by wireless radio, and/or from a network connection or other communication channel. Motion and/or proximity sensing can likewise serve as a user action sensor.

In response to events received, the mode control logic 314 intelligently handles various aspects of the system's audio devices by communicating with the control handling logic 302. Similarly, state changes or the like in the controls are provided to the control handling program (e.g., the operating system 134, master audio controller 312, or an application program 135), along with data that identifies the control. Via controls handling logic 302, the control handling program then acts in the current context corresponding to the control. This may include generating one or more hardware or software events or commands, such as lowering the volume in the system speakers, switching from the system speakers to headphones, muting the system audio, pausing media playback, and so forth.

The control handling program also controls any indicators 320 present as described above to convey information to the user via indicator display logic 304. In specific, the control handling logic 302 and the indicator/display logic 304 communicate with the hardware interface 320 to receive input from the audio controls 322 and send output to the indicators 328 for display. Note that the indicators need not be LEDs, but include any type of mechanism that outputs information that is capable of being sensed by a user, including visual, audible and tactile output. Each of the indicators may be related to one of the controls, and thus each indicator may be incorporated into or positioned proximate its corresponding control. Where the indicators are LEDs, colors and illumination patterns (frequencies, duty cycles, number of pulses, and so forth) may be varied to convey different information to users regarding each control.

Those skilled in the art will appreciate that the functionality implemented within the blocks illustrated in FIG. 3 may be implemented as separate components or the functionality of several or all of the blocks may be implemented within a single component. For example, a separate library may be implemented that contains the functionality of the control handling logic and the functionality of the display logic. In such an implementation, executables linked to the library may send control events directly to the control interface when they are executing on the computer system.

Further, although an operating system 134 (or master audio controller 312 or some application program 135) is shown in FIG. 3 as handling the audio controls 322, it should be noted that the computer system need not be fully operational for the audio controls 322 and/or the indicators 328 to work in accordance with the present invention. Indeed, some of the controls may still work when the computer is powered down, at least to a default extent or to an extent configured by a user. For example, the user may want the audio controls to work as a conventional appliance when the computer system is powered down, so that the user may answer incoming calls using the speakerphone and caller-ID device. Any tasks that do not require a running operating system or application program similarly may remain operational and use the audio controls when the operating system or application program is not available or in standby mode.

To handle the controls and communications-in such a powered-down mode, the master audio controller and control handling logic may be loaded into executable non-volatile memory, operated with a secondary processor, and so forth, so that communication works as long as some power is available, even though the disk, main processor, main display, network card and/or other parts of the system are powered down.

Moreover, the present invention allows for automatic control of audio output devices based upon the user's context. For instance, when notified of an incoming call, a user may press a telephony control button such as a speakerphone button to answer the call. Before the call is connected to the speaker 194 and microphone 163, the master audio controller 312 may automatically mute (or otherwise control) any other audio, such as music that the user was listening to prior to the call. At the end of the call, the user may again press the speakerphone button to disconnect the call, and the master audio controller 312 may restore the audio state as it was prior to the call. As another example, if the user plugs in headphones, the master audio controller 312 may switch the default system audio output device from the PC system speakers to the headphones and mute the system speakers so that they do not disturb others. When the user unplugs the headphones, the master audio controller 312 switches the default system audio output device from the headphones back to PC system speakers and restores their audio volume.

Figure 4:
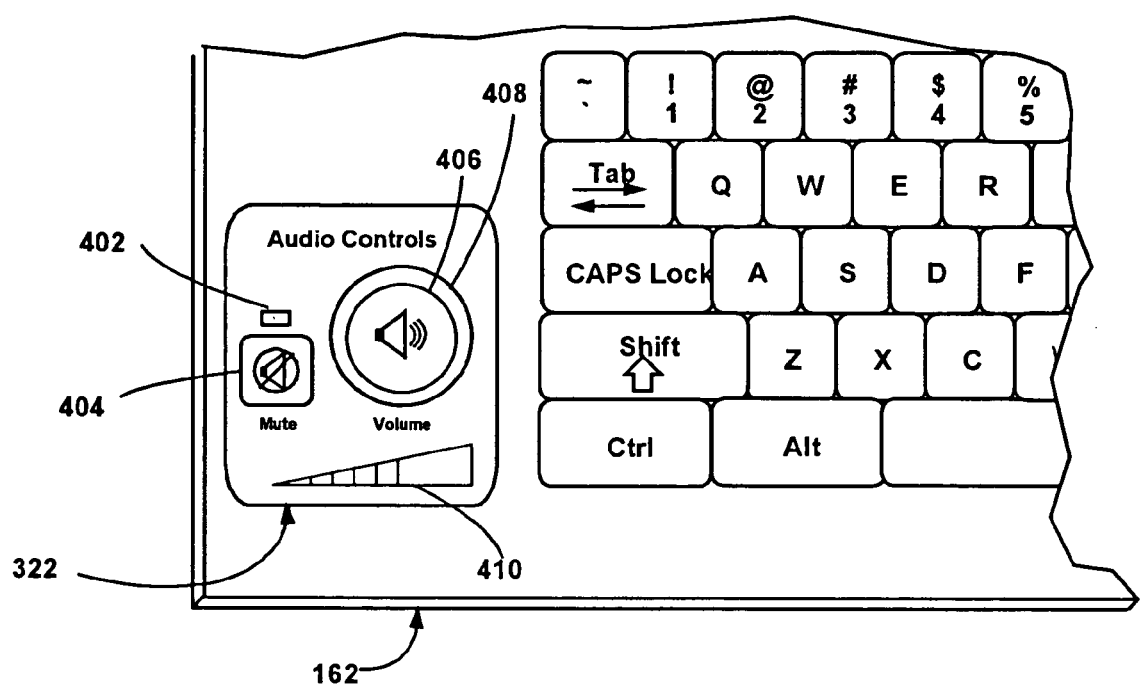
FIG. 4 is a general representation of a partial keyboard with audio controls incorporated into the keyboard, in accordance with an aspect of the present invention.

Turning to an explanation of the operation of the present invention with particular reference to the audio controls 322, FIG. 4 presents a general representation of a partial keyboard with audio controls 322 incorporated into the keyboard 216. Note that an indicator light such as an LED may be optionally associated with one or more of the audio control buttons. For example, there may be an indicator light 402 associated with the speaker mute button 404 that illuminates as a steady red light when system speakers are muted. In addition to the speaker mute button 404 and the speaker volume knob 406 shown, there may be other audio control buttons included such as a wave balance control knob, a treble control knob, a bass control knob, and so forth.

The speaker mute button 404 allows the user to quickly mute the default system audio output device such as the system speakers 194. The speaker mute button can be integrated into a speaker volume knob 406 for "press to mute" functionality. Alternatively, it can be designed as a stand-alone button, in which case it may be located immediately adjacent the volume knob. Because the state of the speaker mute button 404 may not be readily apparent to a user, an indicator light 402 such as an LED may be used in conjunction with the speaker mute button 404. The indicator light for the speaker mute button 402 may be located adjacent to the speaker mute button 404 or integrated into the control itself. Pressing the speaker mute button 404 mutes system volume and sets the speaker mute indicator to amber. Pressing it again restores the previous volume setting and restores the indicator to green.

The speaker system volume knob 406 allows the user to adjust the volume of the default system audio output device such as the system speakers 194. The speaker system volume knob 406 may be coupled with a switch 408 for turning the volume on and off. Multiple indicators may be used to indicate the volume level such as indicator 410 shown. The speaker system volume knob 406 may be located on the lower right corner of the monitor (e.g., if speakers are built in) or in the lower right corner of the device housing the speakers. Alternatively, it may be located on the keyboard or some other location that is easily accessible to the user. It is advantageous for volume controls on the system to be HID (human interface device) compliant so that they may use HID interfaces to stay synchronized with each other. Furthermore, any USB HID-capable speakers need not have analog or power control. Otherwise, any analog volume or power controls on powered speakers may be located behind the speaker units or otherwise out of the user's immediate view.

Figure 5:
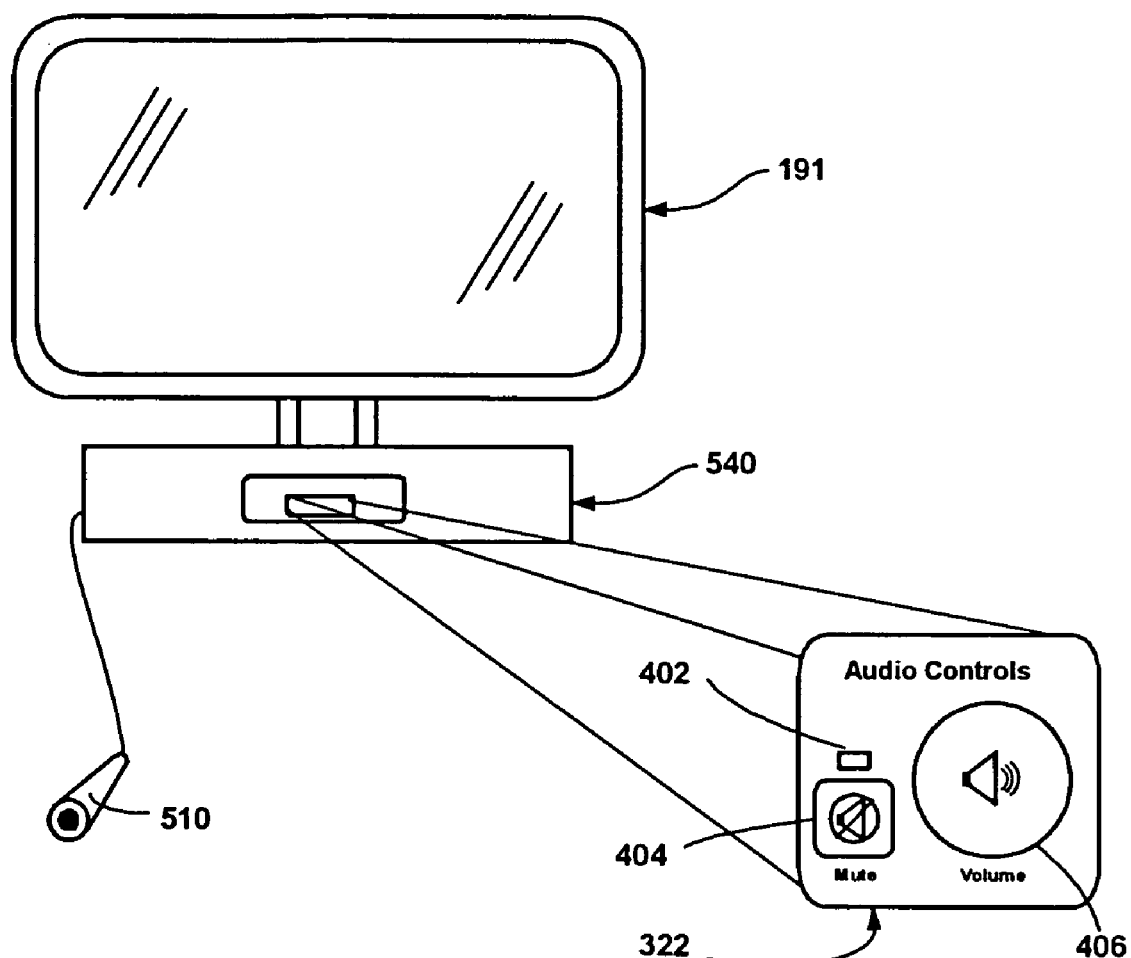
FIG. 5 is a representation of a control panel positioned beneath a computer monitor with audio controls incorporated into the control panel, in accordance with an aspect of the present invention.
Figure 6:
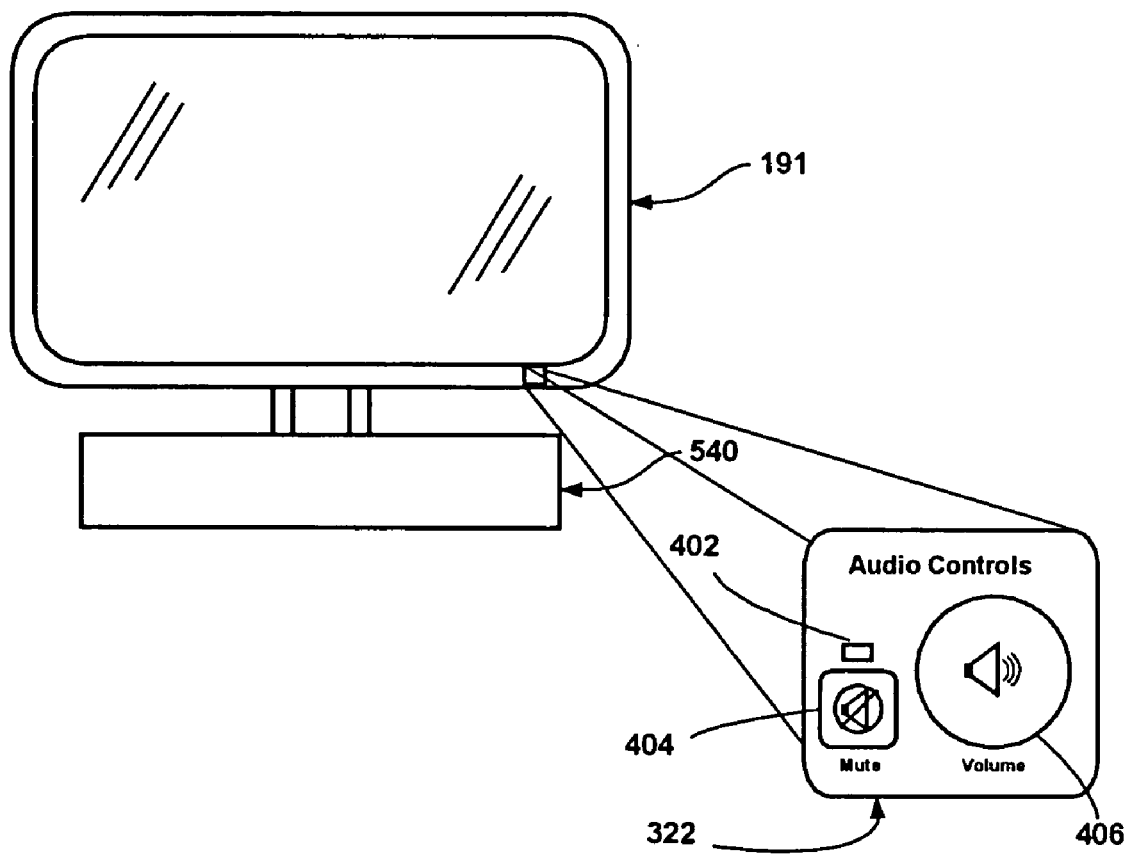
FIG. 6 is a representation of audio controls incorporated into a monitor, in accordance with an aspect of the present invention.

It will be appreciate by those skilled in the art that the audio controls 322 illustrated in FIG. 4 as incorporated in a keyboard are an exemplary configuration and that the present invention may be practiced using other configurations such as the configuration illustrated in FIG. 5 with the audio controls located on a communications panel. In FIG. 5, the speaker mute button 404 and the speaker volume knob 406 are shown magnified from their location on a control panel 540 which is attached to or underneath the main display 191. This location may allow good visibility of the audio controls 322, but it may not be considered as convenient by some user to turn the speaker volume knob as it would be if it was located on the keyboard such as the speaker volume knob illustrated in FIG. 4. FIG. 6 shows another exemplary illustration of the same two audio controls located on the bezel of a monitor 191.

Figure 7:
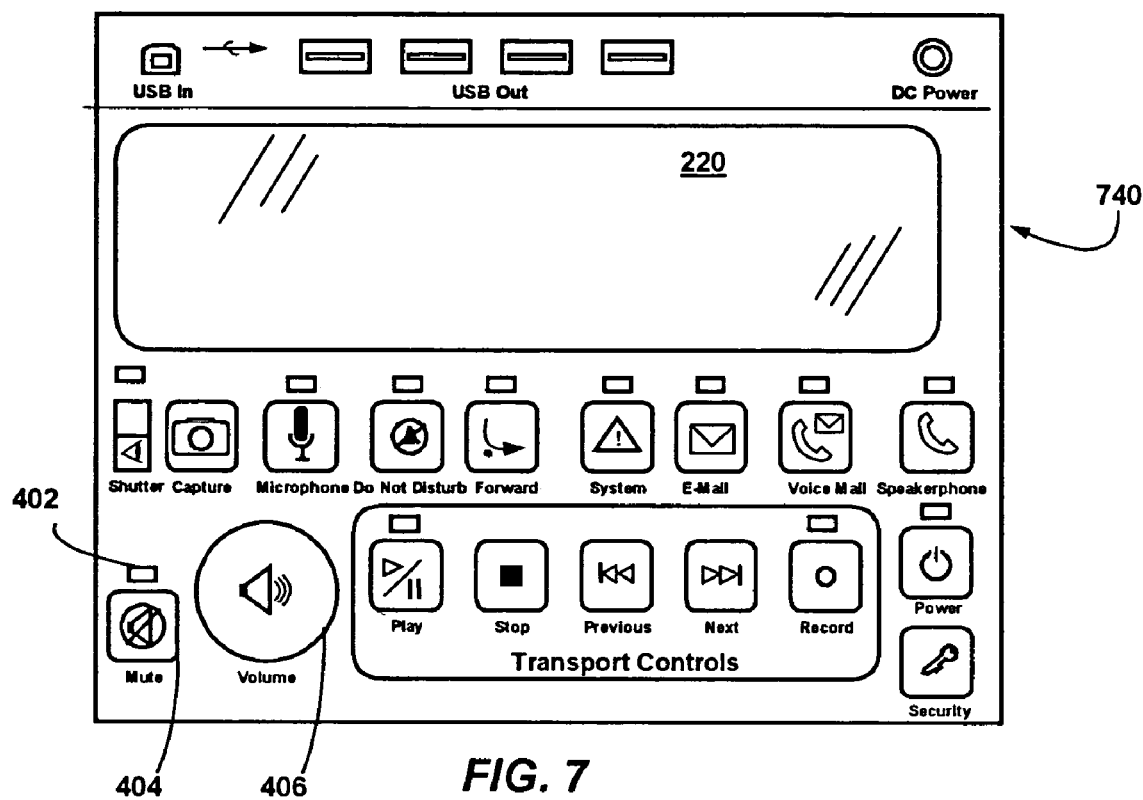
FIG. 7 is a representation of an alternative control panel with audio controls, in accordance with an aspect of the present invention.
Figure 8:
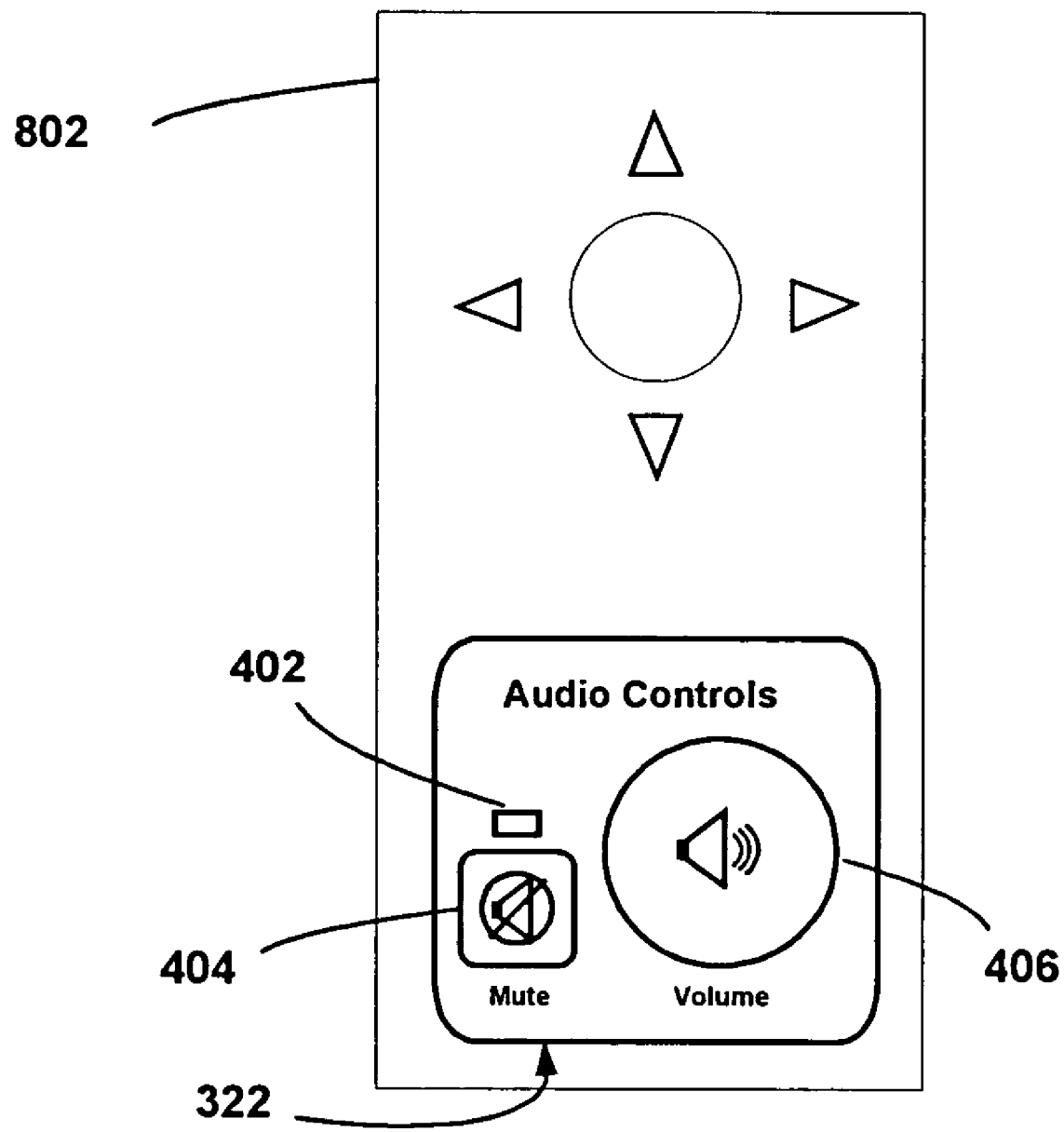
FIG. 8 is a representation of audio controls incorporated into a remote control, in accordance with an aspect of the present invention.

Another alternative control panel 720 incorporating audio controls 322 and including an auxiliary display 220 is shown in FIG. 7. It should be appreciated that one or more audio control 322 buttons need not be grouped with other audio control buttons, but may be grouped with some other set of buttons, or may be an independent button. In fact, the speaker volume knob 406 may be placed on the speaker 194. One or more of the audio controls 322 may also be an add-on to a computer system, such as by providing a button coupled to a USB or infrared port, or as a Bluetooth™ device or other wired or wireless connection. A wired or wireless audio control button, such as constructed to be held by a user, may also be provided either stand-alone or among buttons of a remote control. For example, FIG. 8 illustrates audio controls 322 on remote control 802.

Those skilled in the art will appreciate that there are many applications that may use the audio controls for controlling the default system audio output as well as automatically switching the default system audio output device among various audio output devices. For example, a user notified of receiving a new voice mail may press a play button to listen to the voice mail. The present invention may automatically mute any other audio, such as music that the user was listening to prior to the call, before playing the voice mail over the system speakers. The user may turn up the volume using the speaker volume control while listening to the voice mail play. After the voice mail has been played, the music returns playing at the previous volume setting prior to playing the voice mail.

As can be seen from the foregoing detailed description, there is provided a system and method for unifying audio control on a personal computer. The system and method allows for automatic control of audio output devices based upon the user's context. The system and method is also fairly comprehensive in its ability to control software and hardware audio interfaces, as well as flexible and extensible to handle many user scenarios and uses. Additional audio controls may be easily added. The system and method thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for controlling audio devices in a computer system, comprising the steps of:
receiving an event comprising receiving an incoming telephone call;
communicating the event to a configurable audio controller;
determining a change in a setting of a plurality of audio devices from the event; and
changing the setting of a plurality of audio devices as a result of the determination, including muting an audio output device before establishing the incoming telephone call on an active receiver.

2. The method of claim 1 wherein receiving an event comprises receiving an event generated by an application.

3. The method of claim 1 wherein receiving an event comprises receiving an event generated by a system component.

4. The method of claim 1 wherein receiving an event comprises receiving an event generated by an audio control.

5. The method of claim 1 further comprising, restoring the audio output device setting to a prior state after the telephone call is disconnected.

6. The method of claim 1 wherein determining a change in a setting of a plurality of audio devices comprises using rules for changing a setting of an audio device based upon one or more events.

7. The method of claim 1 wherein determining a change in a setting of a plurality of audio devices comprises using configuration settings.

8. The method of claim 1 wherein changing the setting of a plurality of audio devices further comprises changing the setting of an input audio device.

9. The method of claim 1 wherein the changing the setting of a plurality of audio devices further comprises changing the setting of an output audio device.

10. The method of claim 1 wherein changing the setting of the plurality of audio devices further comprises changing an indicator that uses at least one member of a set comprising visual, audible, and tactile representations.

11. The method of claim 10 wherein the indicator corresponds to a visual indicator, and wherein changing the visual indicator comprises changing an amount of light displayed for a volume setting.

12. The method of claim 10 wherein the indicator corresponds to a visual indicator, and wherein changing the visual indicator comprises changing the indicator to an amber color while muted.

13. The method of claim 1 wherein changing the setting of a plurality of audio devices further comprises restoring settings of an audio output device to a prior state.

14. The method of claim 1 wherein changing the setting of a plurality of audio devices further comprises adjusting a volume of an audio output device.

15. A computer storage computer-readable medium having computer-executable instructions for performing the method of claim 1.

16. A method for controlling audio devices in a computer system, comprising the steps of:
receiving an event corresponding to receiving an incoming telephone call;
communicating the event to a configurable audio controller;
determining a change in a setting of a plurality of audio devices from the event; and
changing the setting of a plurality of audio devices as a result of the determination, including lowering the volume of an audio output device before establishing the incoming telephone call on an active receiver.

17. The method of claim 16 wherein receiving the event comprises receiving an event generated by at least one of: an application, a system component, and an audio control.

18. The method of claim 16 wherein the changing the setting of a plurality of audio devices comprises muting at least one other audio output device before establishing the incoming telephone call.

19. The method of claim 16 further comprising, restoring the audio output device setting to a prior state after the telephone call is disconnected.

20. The method of claim 16 further comprising, restoring the audio output device setting to a prior state after a headset is unplugged.

21. The method of claim 16 wherein determining the change in the setting comprises using rules for changing the setting of the audio device based upon one or more events.

22. The method of claim 16 wherein determining the change in the setting comprises using configuration settings.

23. The method of claim 16 wherein the changing the setting further comprises changing a setting of an input audio device.

24. The method of claim 16 further comprising changing an indicator that uses at least one member of a set comprising visual, audible, and tactile representations.

25. The method of claim 24 wherein the indicator corresponds to a visual indicator, and wherein changing the indicator comprises changing an amount of light displayed for a volume setting.

26. A computer storage computer-readable medium having computer-executable instructions for performing the method of claim 16.

27. A method for controlling audio devices in a computer system, comprising the steps of:
receiving an event corresponding to disconnecting a telephone call;
communicating the event to a configurable audio controller;
determining a change in a setting of a plurality of audio devices from the event; and
changing the setting of a plurality of audio devices as a result of the determination, including restoring an audio output device setting to a prior state after the telephone call is disconnected.

28. The method of claim 27 wherein receiving the event comprises receiving an event generated by at least one of: an application, a system component, and an audio control.

29. The method of claim 27 further comprising, muting at least one other audio output device before establishing an incoming telephone call corresponding to the disconnected telephone call.

30. The method of claim 27 further comprising, restoring the audio output device setting to a prior state after a headset is unplugged.

31. The method of claim 27 wherein determining the change in the setting comprises using rules for changing the setting of the audio device based upon one or more events.

32. The method of claim 27 wherein determining the change in the setting comprises using configuration settings.

33. The method of claim 27 wherein the changing the setting further comprises changing a setting of an input audio device.

34. The method of claim 27 further comprising changing an indicator that uses at least one member of a set comprising visual, audible, and tactile representations.

35. The method of claim 34 wherein the indicator corresponds to a visual indicator, and wherein changing the indicator comprises changing an amount of light displayed for a volume setting.

36. The method of claim 27 wherein changing the setting of a plurality of audio devices comprises muting the audio output device.

37. A computer storage computer-readable medium having computer-executable instructions for performing the method of claim 27.

38. A method for controlling audio devices in a computer system, comprising the steps of:
receiving an event corresponding to plugging in a headset;
communicating the event to a configurable audio controller;
determining a change in a setting of a plurality of audio devices from the event; and
changing the setting of a plurality of audio devices as a result of the determination, including muting an audio output device before connecting audio output on the headset.

39. The method of claim 38 wherein receiving the event comprises receiving an event generated by at least one of: an application, a system component, and an audio control.

40. The method of claim 38 further comprising, restoring the audio output device setting to a prior state after a headset is unplugged.

41. The method of claim 38 wherein determining the change in the setting comprises using rules for changing the setting of the audio device based upon one or more events.

42. The method of claim 38 wherein determining the change in the setting comprises using configuration settings.

43. The method of claim 38 wherein the changing the setting further comprises changing a setting of an input audio device.

44. The method of claim 38 further comprising changing an indicator that uses at least one member of a set comprising visual, audible, and tactile representations.

45. The method of claim 44 wherein the indicator corresponds to a visual indicator, and wherein changing the indicator comprises changing an amount of light displayed for a volume setting.

46. The method of claim 44 wherein the indicator corresponds to a visual indicator, and wherein changing the indicator comprises changing the indicator to the color amber while muted.

47. A computer storage computer-readable medium having computer-executable instructions for performing the method of claim 38.

48. A method for controlling audio devices in a computer system, comprising the steps of:
receiving an event corresponding to unplugging a headset;
communicating the event to a configurable audio controller;
determining a change in a setting of a plurality of audio devices from the event; and
changing the setting of a plurality of audio devices as a result of the determination, including restoring an audio output device setting to a prior state after the headset is unplugged.

49. The method of claim 48 wherein receiving the event comprises receiving an event generated by at least one of: an application, a system component, and an audio control.

50. The method of claim 48 wherein determining the change in the setting comprises using rules for changing the setting of the audio device based upon one or more events.

51. The method of claim 48 wherein determining the change in the setting comprises using configuration settings.

52. The method of claim 48 wherein the changing the setting further comprises changing a setting of an input audio device.

53. The method of claim 48 further comprising, receiving another event corresponding to plugging in a headset, and changing the setting of at least one audio device in response to the other event.

54. The method of claim 48 further comprising changing an indicator that uses at least one member of a set comprising visual, audible, and tactile representations.

55. The method of claim 54 wherein the indicator corresponds to a visual indicator, and wherein changing the indicator comprises changing an amount of light displayed for a volume setting.

56. A computer storage computer-readable medium having computer-executable instructions for performing the method of claim 48.

* * * * *